(No Model.)
E. WALTER.
STOVE GRATE.
No. 381,299. Patented Apr. 17, 1888.
Fig. 1.
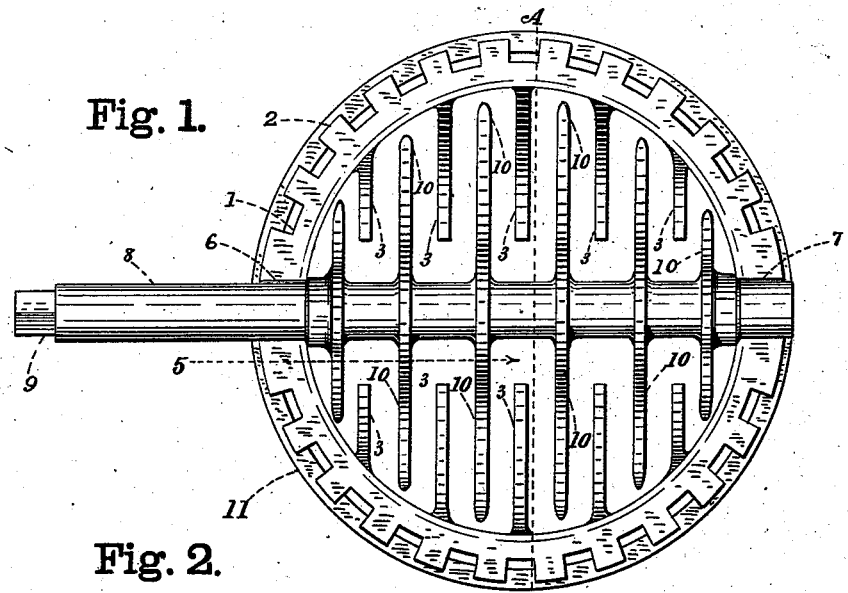
Fig. 2.
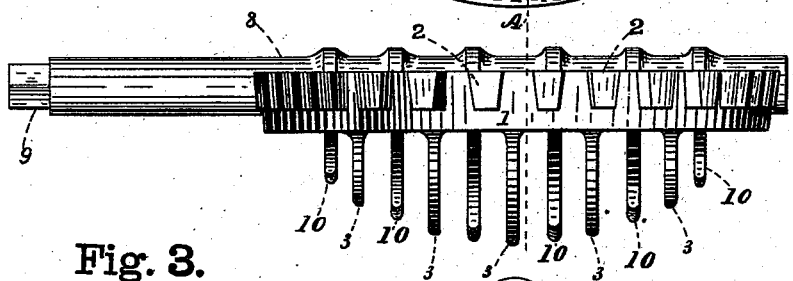
Fig. 3.
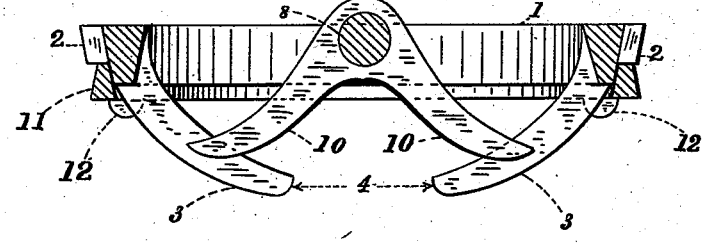
Fig. 4.
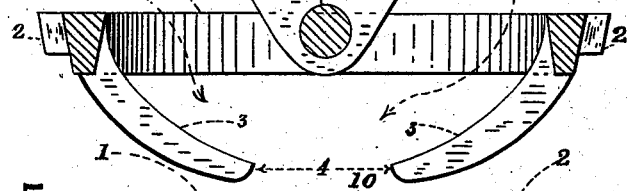
Fig. 5.
Witnesses.
Arthur Sangster
J. E. Johnson
Inventor.
Edward Walter,
By James Sangster
atty.

UNITED STATES PATENT OFFICE.

EDWARD WALTER, OF BUFFALO, NEW YORK.

STOVE-GRATE.

SPECIFICATION forming part of Letters Patent No. 381,299, dated April 17, 1888.

Application filed May 20, 1887. Serial No. 238,857. (No model.)

*To all whom it may concern:*

Be it known that I, EDWARD WALTER, a citizen of the United States, residing in Buffalo, in the county of Erie and State of New York, have invented certain new and useful Improvements in Stove-Grates, of which the following is a specification.

The object of my invention is to produce a simple and efficient rotating grate for heating or cooking stoves or furnaces, and will be fully and clearly hereinafter described and claimed, reference being had to the accompanying drawings, in which—

Figure 1 is a plan or top view of the grate complete. Fig. 2 is a side elevation. Fig. 3 is a vertical cross-section through line A A, Fig. 1. Fig. 4 is a similar section showing the rotating portion of the grate turned up; and Fig. 5 represents, on a reduced scale, a top view of the rotative and stationary part of a grate complete, showing a modified form adapted for use in a cook-stove, where a long narrow grate is required.

For a parlor or heating stove the grate is usually made circular, as shown in Fig. 1. The circular rim 1 is provided on its periphery with a series of short radial bars, 2. On the inside of the circular rim 1 is a series of downwardly-projecting curved grate-bars, 3. These grate-bars 3 are all of about an equal distance from each other between the points 4 (see Figs. 3 and 4) and are each placed about an equal distance apart on the rim 1, thereby forming a concave or hollow grate having an open rectangular space, 5, at the bottom. (See Figs. 1 and 5.) This rim 1, with its short radial bars 2, and grate-bars 3 are preferably made of cast-iron, all formed in one piece.

On the upper side of the rim 1 are two semicircular recesses, 6 and 7, placed directly opposite each other. These depressions 6 and 7 form bearings into which the shaft 8 of the rotative portion of the grate is placed. This shaft is provided with a wrench-section, 9, at the outer end, made either square or of any suitable form adapting it to receive a handle by which it is turned, and it (the shaft 8) is also provided with a series of downwardly and outwardly projecting curved grate-bars, 10, the whole preferably formed in one piece of cast-iron.

The object in having the grate-bars 10 project outward and downward from the shaft 8 is to permit their ends to pass between the bars 3 when in the position shown in Fig. 3, and to pass up out of the way when turned up in the position shown in Fig. 4, so as to leave a large passage (shown by the arrows *c* in said Fig. 4) through which the larger pieces of coal or clinkers may be poked when required, or to leave openings through which the coal may be dumped when necessary, and when in the position shown in Fig. 3 the grate-bars are all near enough together to retain the fuel in position.

12 in Fig. 3 represents a series of lugs on the ring 11 to hold the grate down when required. This grate is very effective in its operation, the rotative portion only requiring one or two revolutions to clean the ashes from the stove, which is done by means of a handle or wrench of any well-known construction and attached in the usual way to the end 9 of the shaft 8.

The grate is also adapted to be set in a stove so as to rest on the ring 11, which allows the usual horizontal shaking movement to be given to it in addition to the rotary movement of the shaft 8 and its grate portion, which is done by taking hold of the end 9 of the shaft 8 in any well-known way. It is attached to a stove in any suitable way well-known to stove manufacturers.

I claim as my invention—

In a stove-grate, a circular rim having a series of curved bars arranged parallel with each other and projecting downward and inward from said rim, so as to leave a space between their ends at a point below the rim, in combination with a rocking or rotative portion consisting of a shaft set in bearings in the circular rim and a series of curved bars projecting parallel with each other from said shaft and set angularly thereon, so as to project outward and downward below the shaft, whereby, when the shaft is turned so that the curved bars project down between the lower portions of the curved bars on the circular rim, the space is sufficiently closed to hold the fuel, and when turned up, so that the bars project above the rim, a large open space, *c*, is left on each side of the shaft for the passage of ashes and cinders, as described.

EDWARD WALTER.

Witnesses:
JAMES SANGSTER,
ARTHUR SANGSTER.